(12) United States Patent
Zhao et al.

(10) Patent No.: US 10,848,771 B2
(45) Date of Patent: Nov. 24, 2020

(54) ENCODING AND DECODING A VIDEO SIGNAL

(71) Applicant: Huawei Technologies Co., Ltd., Shenzhen (CN)

(72) Inventors: Zhijie Zhao, Munich (DE); Johannes Sauer, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,282

(22) Filed: Mar. 29, 2019

(65) Prior Publication Data

US 2019/0230368 A1     Jul. 25, 2019

Related U.S. Application Data

(63) Continuation of application No. PCT/EP2016/001625, filed on Sep. 30, 2016.

(51) Int. Cl.
| | |
|---|---|
| *H04N 19/00* | (2014.01) |
| *H04N 19/176* | (2014.01) |
| *H04N 19/55* | (2014.01) |
| *H04N 19/563* | (2014.01) |
| *H04N 19/597* | (2014.01) |
| *H04N 19/124* | (2014.01) |

(Continued)

(52) U.S. Cl.
CPC ......... *H04N 19/176* (2014.11); *H04N 19/124* (2014.11); *H04N 19/159* (2014.11); *H04N 19/182* (2014.11); *H04N 19/55* (2014.11); *H04N 19/563* (2014.11); *H04N 19/597* (2014.11)

(58) Field of Classification Search
CPC .... H04N 19/55; H04N 19/597; H04N 19/124; H04N 19/176; H04N 19/182; H04N 19/563; H04N 19/159
See application file for complete search history.

(56) References Cited

U.S. PATENT DOCUMENTS

| | | |
|---|---|---|
| 5,235,419 A | 8/1993 | Krause |
| 5,376,968 A | 12/1994 | Wu et al. |

(Continued)

FOREIGN PATENT DOCUMENTS

| | | |
|---|---|---|
| CN | 101002473 A | 7/2007 |
| JP | 2005159824 A | 6/2005 |

(Continued)

OTHER PUBLICATIONS

Choi et al. "Test sequence formats for virtual reality video coding," Joint Video Exploration Team (JVET) of ITU-T SG 16 WP 3 and ISO/IEC JTC 1/SC 29/WG 11, JVET-C0050, 3rd Meeting: Geneva, CH, pp. 1-6, International Union of Telecommunication—Geneva, Switzerland (May 26-Jun. 1, 2016).

(Continued)

*Primary Examiner* — Zhihan Zhou

(74) *Attorney, Agent, or Firm* — Leydig, Voit & Mayer, Ltd.

(57) ABSTRACT

An apparatus and a method for encoding a video signal. A segment of a reference frame and an extension region generated from another segment are used for encoding a current frame by inter-prediction. An apparatus and a method for decoding are also disclosed.

16 Claims, 9 Drawing Sheets

(51) Int. Cl.
*H04N 19/159* (2014.01)
*H04N 19/182* (2014.01)

(56) References Cited

U.S. PATENT DOCUMENTS

| | | | |
|---|---|---|---|
| 6,005,980 | A | 12/1999 | Eifrig et al. |
| 6,980,596 | B2 | 12/2005 | Wang et al. |
| 7,162,094 | B2 | 1/2007 | Wang et al. |
| 7,327,899 | B2 | 2/2008 | Liu et al. |
| 7,769,087 | B2 | 8/2010 | Wang et al. |
| 7,999,842 | B1 | 8/2011 | Barrus et al. |
| 9,277,122 | B1 | 3/2016 | Imura et al. |
| 2006/0034530 | A1* | 2/2006 | Park ............... G06T 9/004 382/236 |
| 2013/0251039 | A1* | 9/2013 | Drugeon ........... H04N 19/176 375/240.14 |

FOREIGN PATENT DOCUMENTS

| | | |
|---|---|---|
| JP | 2008509630 A | 3/2008 |
| KR | 20060050351 A | 5/2006 |
| RU | 2503062 C2 | 12/2013 |
| WO | 2018009746 A1 | 1/2018 |

OTHER PUBLICATIONS

Chen et al, "Expanding Line Search for Panorama Motion Estimation," 11th IEEE International Symposium on Multimedia, XP031587065, pp. 577-582, Institute of Electrical and Electronics Engineers—New York, New York (Dec. 14, 2009).

Jiang et al: "Compression of Cubic-Panorama Datasets with Spatially Consistent Representation," HAVE 2006—IEEE International Workshop on Haptic Audio Visual Environments and Their Application, pp. 111-116, XP031041913, Institute of Electrical and Electronics Engineers—New York, New York (2006.).

Geiger et al: "Panoramic Views for Virtual Endoscopy," Medical Image Computing and Computer-Assisted Intervention—MIC CAI 2005 Lecture Notes in Computer, pp. 662-669, XP019021695 (Jan. 1, 2005).

Hartley et al., "More Single View Geometry," Multiple View Geometry in Computer Vision, pp. 195-236, XP055378454 (Mar. 25, 2004).

Kangni et al.,"Epipolar Geometry for the Rectification of Cubic Panoramas," The 3rd Canadian Conference on Computer and Robot Vision, IEEE, pp. 70-79, XP010919381, Institute of Electrical and Electronics Engineers—New York, New York (Jun. 7, 2006).

* cited by examiner

ENCODING AND DECODING A VIDEO SIGNAL

CROSS-REFERENCE TO RELATED APPLICATIONS

This application is a continuation of International Application No. PCT/EP2016/001625, filed on Sep. 30, 2016, the disclosure of which is hereby incorporated by reference in its entirety.

TECHNICAL FIELD

Generally, the present disclosure relates to the field of video coding. More specifically, the present disclosure relates to apparatuses and methods for encoding and decoding a video coding block of a video signal.

BACKGROUND

A 360° panoramic video signal comprises a sequence that captures the scene in all directions around a single view point. This is usually achieved using multiple cameras arranged near each other and with different view directions. The captured content is then stitched together and can be thought of as a sphere around the view point with texture on it, which represents the 360° scene or panoramic video signal at a certain point in time. Such a sphere, however, cannot be processed directly using current video codecs, which generally require a flat (two-dimensional, 2D) rectangular image of a scene. Thus, in order to process a panoramic video signal using current video codecs the sphere has to be converted to such a 2D format.

For converting the sphere into a 2D format comprising one or more segments one of the following projections can be used.

An equirectangular projection defines a projection to a rectangle similar of the one that creates world maps from the globe of the earth. The sample density differs with different "heights". Extreme case are the poles of the sphere, they are mapped to lines. Geometrical distortions are spread all over the resulting image.

In a projection based on a cube the sphere is mapped to the faces or segments of a cube. Each segment looks like a usual 2D image with no visible geometrical distortions. However, there are strong geometrical distortions in the boundary regions of the segments. There are multiple ways to arrange the segments in a rectangular format.

In a projection based on an icosahedron the sphere is mapped to the faces or segments of an icosahedron. Each segment looks like a usual 2D image with no visible geometrical distortions. Also in this case there are strong geometrical distortions in the boundary regions of the segments of the icosahedron. These distortions, however, are not as strong as in the case of a projection based on the cube format, since the angle between neighboring faces is smaller. There are multiple ways to arrange the icosahedron faces in a rectangular format.

Both the cube and icosahedron format consist of undistorted segments, which share the same camera center and edges.

In encoding and decoding of panoramic video signals comprising a plurality of segments the following problem can arise. Let there be two faces or segments which have the same camera center and share a border, i.e. face A and face B. The images of face A and B are recorded over time and arranged in subsequent frames of the panoramic video signal. This panoramic video signal is then encoded.

If the images of face A and B are not arranged next to each other in the sequence, motion compensation cannot be performed across their shared border. However, even if they are arranged such that they share the same border in the panoramic video signal as they share in 3D (three-dimensional) space, there is a geometrical distortion across their common border in the panoramic video signal. This degrades the performance of motion compensation at the border regions of the images of face A and B of the panoramic video signal.

Thus, there is a need for improved apparatuses and methods for encoding and decoding a video signal (e.g., a panoramic video signal) which comprises two or more segments that correspond to different image planes.

SUMMARY

It is an object of the disclosure to provide improved apparatuses and methods for encoding and decoding a video signal.

The foregoing and other objects are achieved by the subject matter of the independent claims. Further implementation forms are apparent from the dependent claims, the description and the figures.

As used herein, a video signal or video sequence is a set of subsequent frames presenting a motion picture. In other words, a video signal or video sequence consists of a plurality of frames (also referred to as pictures or images).

As used herein, coding tree unit (CTU) denotes the root of a coding structure of the video sequence of a pre-defined size, containing a part of a frame (e.g. 64×64 pixels). A CTU can be partitioned into several coding units (CUs).

As used herein, coding unit (CU) denotes a basic coding structure of the video sequence of a pre-defined size, containing a part of a frame, which is belonging to a CTU. A CU can be partitioned into further CUs.

As used herein, prediction unit (PU) denotes a coding structure, which is the result of partitioning of a CU.

As used herein, a block denotes a group of pixels. The block can have any shape, in particular square or rectangular.

The devices and methods described herein may be used for inter-prediction between pictures to exploit the temporal redundancy of natural video sequences. The change of information observed between the current picture and a reference picture can often be approximated by translational movement, e.g. linear movement within the image plane. Block based motion compensation is the dominating realisation of this paradigm, where a reference picture is partitioned into rectangular blocks and each pixel within a block is exhibiting the same motion. Thus, the movement of the entire block, called the prediction block, can be described by a single motion vector. The set of motion vectors over the whole reference picture defined a vector field, which is denoted as a motion vector field.

According to a first aspect the disclosure relates to an apparatus for encoding a video signal, the video signal comprising video content which includes video content of a first image plane and video content of a second image plane, the video content being provided in the form of a plurality of successive frames, wherein each frame of the plurality of successive frames comprises a first segment which comprises image content of the first image plane and a second segment which comprises image content of the second image plane, the first segment and the second segment each comprising a plurality of pixels, each pixel being associated with a pixel value, the apparatus comprising:

a segment extension unit configured to generate an extension region of the first segment of a reference frame the extension region comprising a plurality of extension pixels, wherein for each extension pixel the segment extension unit is configured to determine the pixel value of the extension pixel on the basis of a pixel value of a pixel of the second segment of the reference frame; and an inter-prediction encoding unit configured to select a reference block among a set of candidate reference blocks, the set of candidate reference blocks comprising a candidate reference block located entirely or partly in the extension region of the first segment of the reference frame, and configured to encode the pixel values of the pixels of a video coding block of the first segment of a current frame on the basis of the pixel values of the pixels of the video coding block and the pixel values of the pixels of the selected reference block.

Thus, an improved apparatus for encoding a video signal is provided. More specifically, the encoding apparatus according to the first aspect allows extending the first segment of a reference frame on the basis of its adjacent segments in such a way that the geometrical distortion across their common edges is compensated. Motion compensation for blocks in the first segment of the current frame can be performed on the basis of the first segment and its extension regions in the reference frame. No additional signaling is needed, since it can be derived from the spatial position in the sequence frame how the compensation of geometrical distortion should be performed. Embodiments of the disclosure can readily be used for motion compensation of 360° sequences in the cube, icosahedron or other formats, which consist of many undistorted faces, sharing edges and sharing the same camera center. Embodiments of the disclosure allow increasing the coding performance, for instance, if there is camera movement or moving objects in a scene.

The reference frame may be a reconstructed frame. It can obtained by encoding a frame of the plurality of successive frames, and then decoding the encoded frame.

The first image plane and the second image plane may be angled relative to each other by an inter-plane angle (e.g., between 1° and 90°).

In one implementation form, a frame includes a succession of sub-frames, each sub-frame comprising only a subset of all segments (e.g., only one segment). Each sub-frame can be used to update a respective subset of segments.

The first segment and the second segment may be neighboring segments. In particular, they may be adjoining segments.

In a first possible implementation form of the encoding apparatus according to the first aspect as such, for each extension pixel the segment extension unit is configured to determine the pixel value of the extension pixel on the basis of a pixel value of a pixel of the second segment of the reference frame using a mapping configured to map the pixel of the second segment of the reference frame to the first image plane (first variant); or configured to map the extension pixel to the second image plane (second variant).

In the first variant of this the extension pixel is determined from the pixel of the second segment of the reference frame. In the second variant, the pixel of the second segment is determined from the extension pixel (e.g., using a geometrical transformation inverse to a geometrical transformation associated with the first variant).

It is further noted that in the mapping, a pixel from one image plane may come to lie not exactly on one pixel in the other image plane. Rather, it may come lie at a geometrical point of the other image plane that is located in between two or more neighboring pixels of the other plane. For this reason, the segment extension unit may be configured, for example, to determine the pixel value of the extension pixel on the basis of the pixel values of a group of pixels (e.g., two, three, or four pixels) located near the geometrical point in the first image plane to which the pixel of the second segment is mapped.

In a second possible implementation form of the encoding apparatus according to the first implementation form of the first aspect, the mapping comprises or is equivalent to the following steps: projecting a pixel $p_B$ of the second segment of the reference frame to a point $p_{3D}$ in three-dimensional space, wherein the point $p_{3D}$ lies on a line connecting the pixel $p_B$ of the second segment of the reference frame with a camera position C; performing a rotation for rotating the image plane of the second segment of the reference frame into a parallel orientation with respect to the image plane of the first segment of the reference frame; and projecting the point $p_{3D}$ to a point $p_A$ in the image plane of the first segment of the reference frame, wherein the point $p_A$ in the image plane of the first segment of the reference frame defines an extension pixel.

In a third possible implementation form of the encoding apparatus according to the first or second implementation form of the first aspect, the mapping is based on the following homography matrix $H_{B2A}$:

$$H_{B2A} = (K_A \quad 0)\begin{pmatrix} R(\theta) & 0 \\ 0 & 1 \end{pmatrix}\begin{pmatrix} K_B^{-1} \\ 0 \quad 0 \quad Z^{-1} \end{pmatrix} = K_A R(\theta) K_B^{-1}$$

wherein $K_A$ and $K_B$ denote camera calibration matrices for the first segment and the second segment of the reference frame, $\theta$ denotes the angle between the image plane of the first segment and the image plane of the second segment of the reference frame, $R(\theta)$ denotes a rotation and Z denotes a distance from a camera position C. The homography matrix may be applied, for example, to xy-coordinates of the second image plane, or directly on pixel coordinates.

In a fourth possible implementation form of the encoding apparatus according to the first aspect as such or any one of its implementation forms, the encoding apparatus further comprises a reference frame buffer configured to store the first segment of the reference frame together with the extension region of the first segment of the reference frame.

In a fifth possible implementation form of the encoding apparatus according to the first aspect as such or any one of its implementation forms, the first segment corresponds to a first face of a cube or of an icosahedron and the second segment correspond to different faces of a cube or an icosahedron. The faces may be external or internal faces.

According to a second aspect the disclosure relates to an apparatus for decoding an encoded video signal, the encoded video signal comprising video content which includes video content of a first image plane and video content of a second image plane (e.g., angled relative to each other by an inter-plane angle; e.g., between 1° and 90°), the video content being provided in an encoded form of a plurality of successive frames, wherein each frame of the plurality of successive frames comprises a first segment which comprises image content of the first image plane and a second segment which comprises image content of the second plane, the first segment and the second segment each comprising a plurality of pixels, each pixel being associated with a pixel value, the apparatus comprising:

a segment extension unit configured to generate an extension region of the first segment of a reference frame, the extension region comprising a plurality of extension pixels, wherein for each extension pixel the segment extension unit is configured to determine the pixel value of the extension pixel on the basis of a pixel value of a pixel of the second segment of the reference frame; and an inter-prediction reconstruction unit configured to reconstruct the pixel values of the pixels of a video coding block of the first segment of the current frame on the basis of an encoded video coding block of the first segment of a current frame and the pixel values of the pixels of a reference block, wherein the reference block is located entirely or partly in the first segment of the reference frame or entirely or partly in the extension region of the first segment of the reference frame.

In a first possible implementation form of the decoding apparatus according to the second aspect as such, for each extension pixel the segment extension unit is configured to determine the pixel value of the extension pixel on the basis of a pixel value of a pixel of the second segment of the reference frame using a mapping configured to map the pixel of the second segment of the reference frame to the image plane of the first segment of the reference frame or configured to map the extension pixel to the second image plane.

In a second possible implementation form of the decoding apparatus according to the first implementation form of the second aspect, the mapping comprises the following steps: projecting a pixel $p_B$ of the second segment of the reference frame to a point $p_{3D}$ in three-dimensional space, wherein the point $p_{3D}$ lies on a line connecting the pixel $p_B$ of the second segment of the reference frame with a camera position C; performing a rotation for rotating the image plane of the second segment of the reference frame into a parallel orientation with respect to the image plane of the first segment of the reference frame; and projecting the point $p_{3D}$ to a point $p_A$ in the image plane of the first segment of the reference frame, wherein the point $p_A$ in the image plane of the first segment of the reference frame defines an extension pixel.

In a third possible implementation form of the decoding apparatus according to the first or second implementation form of the second aspect, the mapping is based on the following homography matrix $H_{B2A}$:

$$H_{B2A} = (K_A \quad 0) \begin{pmatrix} R(\theta) & 0 \\ 0 & 1 \end{pmatrix} \begin{pmatrix} K_B^{-1} \\ 0 \quad 0 \quad Z^{-1} \end{pmatrix} = K_A R(\theta) K_B^{-1}$$

wherein $K_A$ and $K_B$ denote camera calibration matrices for the first segment and the second segment of the reference frame, $\theta$ denotes the angle between the image plane of the first segment and the image plane of the second segment of the reference frame, $R(\theta)$ denotes a rotation and Z denotes a distance from a camera position C.

In a fourth possible implementation form of the decoding apparatus according to the second aspect as such or any one of its implementation forms, the decoding apparatus further comprises a reference frame buffer configured to store the first segment of the reference frame together with the extension region of the first segment of the reference frame.

In a fifth possible implementation form of the decoding apparatus according to the second aspect as such or any one of its implementation forms, the first segment and the second segment correspond to different faces of a cube or an icosahedron.

In a sixth possible implementation form of the decoding apparatus, the segment extension unit is configured to perform segment extension based on a flag/information at a block level for each video coding block, at a frame level, at a GOP (group of pictures) level, at a PPS (picture parameter set) level or at an SPS (sequence parameter set) level. Based on the status of the flag, segment extension operation can be enabled or disabled.

According to a third aspect the disclosure relates to a method for encoding a video signal, the video signal comprising video content which includes video content of a first image plane and video content of a second image plane, the video content being provided in the form of a plurality of successive frames, wherein each frame of the plurality of successive frames comprises a first segment which comprises image content of the first image plane and a second segment which comprises image content of the second image plane, the first segment and the second segment each comprising a plurality of pixels, each pixel being associated with a pixel value, wherein the method comprises:

generating an extension region of the first segment of a reference frame, the extension region comprising a plurality of extension pixels, wherein generating the extension region comprises, for each extension pixel, determining the pixel value of the extension pixel on the basis of a pixel value of a pixel of the second segment of the reference frame;

selecting a reference block among a set of candidate reference blocks, the set of candidate reference blocks comprising a candidate reference block located entirely or partly in the extension region of the first segment of the reference frame; and encoding the pixel values of the pixels of a video coding block of the first segment of a current frame on the basis of the pixel values of the pixels of the video coding block and the pixel values of the pixels of the selected reference block.

Again, the first image plane and the second image plane may be angled relative to each other by an inter-plane angle (e.g., between 1° and 90°).

According to a fourth aspect the disclosure relates to a method for decoding an encoded video signal, the encoded video signal comprising video content which includes video content of a first image plane and video content of a second image plane, the video content being provided in an encoded form of a plurality of successive frames, wherein each frame of the plurality of successive frames comprises a first segment which comprises image content of the first image plane and a second segment which comprises image content of the second plane, the first segment and the second segment each comprising a plurality of pixels, each pixel being associated with a pixel value, wherein the method comprises:

generating an extension region of the first segment of a reference frame, the extension region comprising a plurality of extension pixels, wherein generating the extension region comprises, for each extension pixel, determining the pixel value of the extension pixel on the basis of a pixel value of a pixel of the second segment of the reference frame; and reconstructing the pixel values of the pixels of a video coding block of the first segment of the current frame on the basis of an encoded video coding block of the first segment of a current frame and the pixel values of the pixels of a reference block, wherein the reference block is located entirely or partly in the first segment of the reference frame or entirely or partly in the extension region of the first segment of the reference frame.

The decoding method according to the fourth aspect of the disclosure can be performed by the decoding apparatus according to the second aspect of the disclosure. Further features of the decoding method according to the fourth aspect of the disclosure result directly from the functionality of the decoding apparatus according to the second aspect of the disclosure and its different implementation forms.

In one implementation form of the decoding method according to the fourth aspect of the disclosure or in the decoding apparatus according to the second aspect of the disclosure, the segment extension unit is configured to perform segment extension based on a flag/information at a block level for each video coding block, at a frame level, at a GOP (group of pictures) level, at a PPS (picture parameter set) level or at an SPS (sequence parameter set) level. Based on the status of the flag, segment extension operation can be enabled or disabled.

According to a fifth aspect, the disclosure relates to a computer program comprising program code for performing the encoding method according to the third aspect or the decoding method according to the fourth aspect when executed on a computer.

The disclosure can be implemented in hardware and/or software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
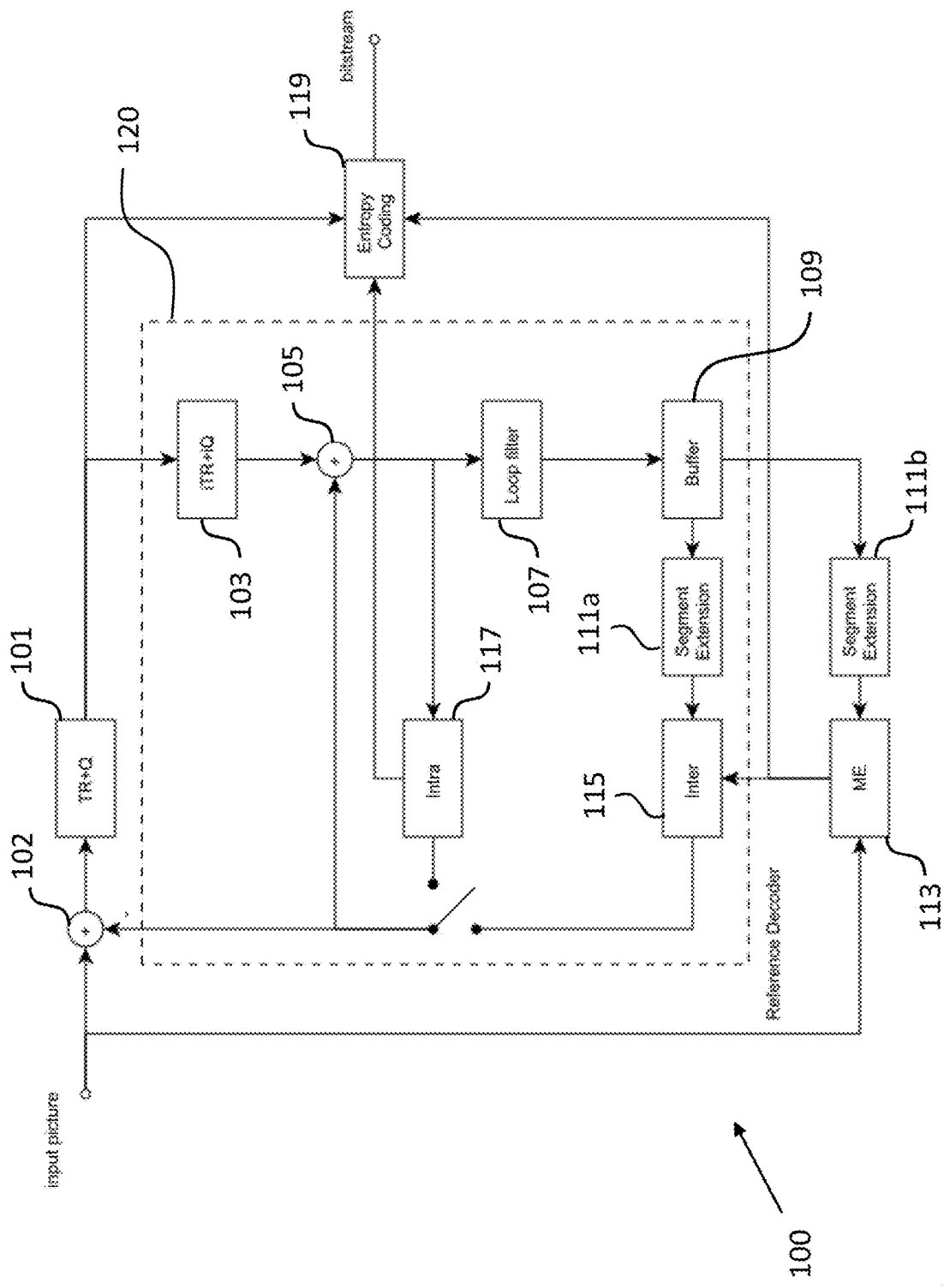
FIG. 1 shows a schematic diagram illustrating an apparatus for encoding a video signal according to an embodiment.

FIG. 1 shows a schematic diagram illustrating an apparatus 100 for encoding a video coding block of a video signal according to an embodiment, wherein the video signal comprises a plurality of frames and each frame comprises a plurality of segments, including a first segment and second segment. Each segment is associated with a different image plane and is dividable into a plurality of video coding blocks, wherein each video coding block comprises a plurality of pixels and each pixel is associated with a pixel value. In an embodiment, the video coding blocks could be macro blocks, coding tree units, coding units, prediction units and/or prediction blocks.

The encoding apparatus 100 comprises a segment extension unit 111a, 111b configured to generate an extension region of the first segment of a reference frame comprising a plurality of extension pixels, as will be described in more detail below. For each extension pixel the segment extension unit 111a, 111b is configured to determine the pixel value of the extension pixel on the basis of a pixel value of a pixel of the second segment of the reference frame.

The encoding apparatus 100 further comprises an inter prediction unit 113, 115 configured to perform motion compensation of a video coding block of the first segment of a currently processed frame, i.e. to generate a predicted video coding block on the basis of the co-located video coding block in the reference frame, on the basis of the pixels of the first segment of the reference frame and the extension pixels of the extension region of the reference frame as well as an encoding unit 101, 119 configured to generate an encoded video coding block on the basis of the predicted video coding block. As will be described in more detail further below, the encoding unit 101, 119 can comprise a transformation and quantization unit 101 and/or an entropy coding unit 119.

The embodiment of the encoding apparatus 100 shown in FIG. 1 operates in the following way. A frame of the video signal, which includes a plurality of segments, such as 3×2 cube segments, is split into a plurality of non-overlapping video coding blocks. For each currently processed video coding block the predictor block, i.e. the predicted current video coding block, is subtracted by a subtraction unit 102 providing a residual video coding block. Then, the residual video coding block is transformed and quantized by the transformation and quantization unit 101 shown in FIG. 1 and entropy encoded by the entropy coding unit 119. Video coding blocks, which already have been encoded, are made available by the reference decoder 120. The reference decoder 120 comprises a reverse transformation and quantization unit 103, which reverses the operation of the transformation and quantization unit 101 (here a quantization error may be introduced). An addition unit 105 combines the residual video coding block with the predictor block to obtain a reconstructed video coding block, which is made available for intra prediction of other video coding blocks of the same frame using an intra prediction unit 117.

The reconstructed video coding block is possibly loop filtered by a loop filter unit 107 (choice can be made by a control unit of the encoding apparatus 100) and stored in a reference frame buffer 109. At this stage the reconstructed video coding block is also available for inter prediction of video coding blocks of other frames. If the reference frame buffer 109 is accessed, the segment extension unit 111a, 111b can provide an extension region of the segment comprising the current video coding block, as already mentioned above and as will be described in more detail further below. Although in FIG. 1 two segment extension units 111a, 111b are shown for the purpose of illustration, it will be readily appreciated that the two segment extensions units 111a, 111b shown in FIG. 1 can be implemented in form of a single unit as well.

As already mentioned above, the data provided by the segment extension unit 111a, 111b is used by the inter prediction unit 115 for performing motion compensation. To this end, the encoding apparatus 100 shown in FIG. 1 further comprises a motion estimation unit 113. In other embodiments, the motion estimation unit 113 can be implemented as a part of the inter prediction unit 115. Generally, a control unit of the encoding apparatus 100 (not shown in FIG. 1) selects the currently processed video coding block and the prediction mode, i.e. intra or inter prediction, for predicting the currently processed video coding block. This information is also needed by the decoding apparatus 200 shown in FIG. 2 and hence also entropy coded into the bitstream by the entropy coding unit 119.

Figure 2:
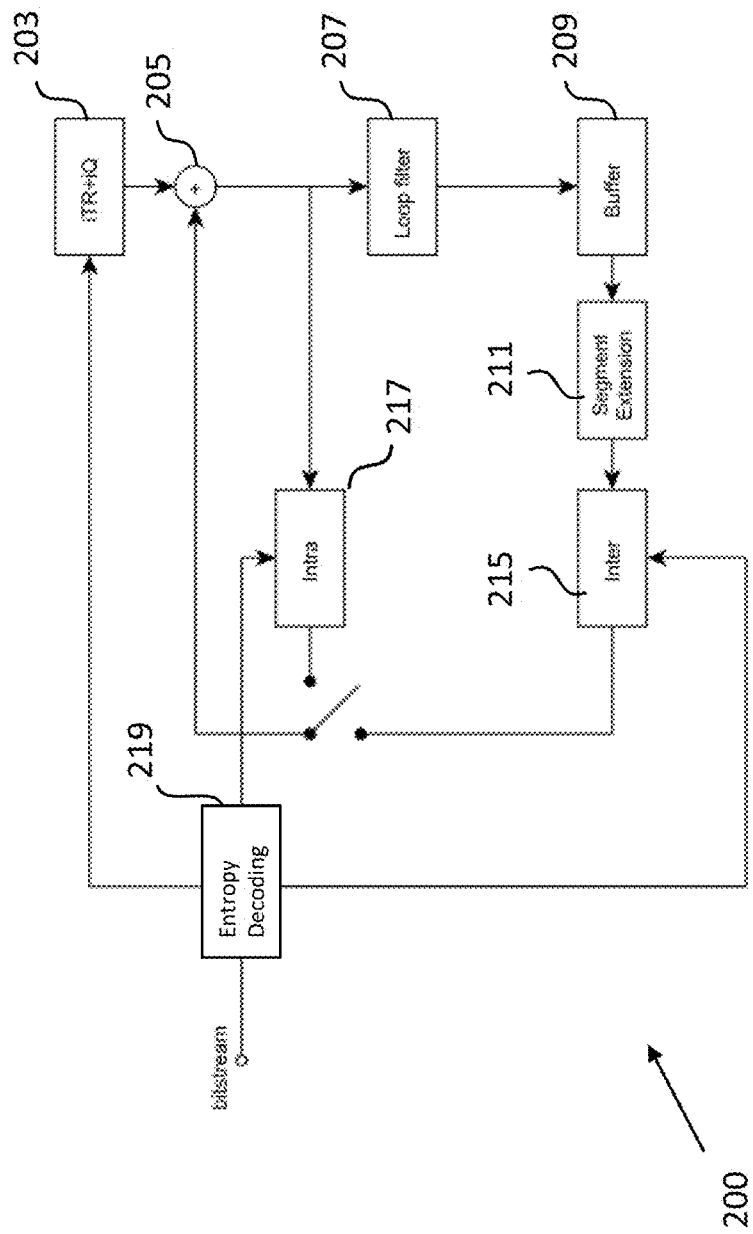
FIG. 2 shows a schematic diagram illustrating an apparatus for decoding a video signal according to an embodiment.

FIG. 2 shows a schematic diagram illustrating an apparatus 200 for decoding an encoded video coding block of a video signal according to an embodiment, wherein the video signal comprises a plurality of frames and each frame comprises a plurality of segments, including a first segment and second segment. Each segment is associated with a different image plane and is dividable into a plurality of video coding blocks, wherein each video coding block comprises a plurality of pixels and each pixel is associated with a pixel value.

The decoding apparatus 200 comprises a decoding unit 203, 219 configured to decode a video coding block of the first segment of a current frame for providing a residual video coding block. As will be described in more detail further below, the decoding unit 203, 219 can comprise a reverse transformation and quantization unit 203 and/or an entropy coding unit 219.

The decoding apparatus 200 further comprises a segment extension unit 211 configured to generate an extension region of the first segment of a reference frame comprising a plurality of extension pixels, wherein for each extension pixel the segment extension unit 211 is configured to determine the pixel value of the extension pixel on the basis of a pixel value of a pixel of the second segment of the reference frame, as will be described in more detail further below.

The decoding apparatus 200 further comprises an inter prediction unit 215 configured to perform motion compensation of the video coding block of the first segment of the current frame, i.e. to generate a predicted video coding block on the basis of the co-located video coding block in the reference frame, on the basis of the pixels of the first segment of the reference frame and the extension pixels of the extension region of the reference frame.

The decoding apparatus 200 further comprises a reconstruction unit 209 configured to reconstruct the video coding block of the current frame on the basis of the predicted video coding block and the residual video coding block.

The embodiment of the decoding apparatus 200 shown in FIG. 2 operates in the following way. A current frame of the video signal is split into a plurality of non-overlapping video coding blocks. The residuals of a currently processed video coding block, i.e. the residual video coding block, are decoded by the entropy coding unit 219 together with the corresponding parameters for inter and intra prediction. The residual video coding block is processed by the reverse transformation and quantization unit 203 and added by the addition unit 205 to the predicted video coding block for generating the reconstructed video coding block. The reconstructed video coding block is provided to an intra prediction unit 217 for intra prediction of other video coding blocks of the same frame. Moreover, the reconstructed video coding block can be loop filtered by a loop filter 207 (the choice can be made by a control unit of the decoding apparatus 200) and stored in a reference frame buffer 209. At this stage the reconstructed video coding block is also available for inter prediction of video coding blocks of other frames. If the reference frame buffer 209 is accessed, the segment extension unit 211 can provide an extension region of the segment in the reference frame, as already mentioned above and as will be described in more detail further below. The reference frame buffer 209 is configured to output processed frames in output order.

For more details about the some of the known units of the encoding apparatus 100 and the decoding apparatus 200 described above reference is made to the textbook "High Efficiency Video Coding," Mathias Wien, first edition, Springer-Verlag Berlin Heidelberg, 2015, which is entirely incorporated herein by reference.

In an embodiment, the segment extension unit 111a, 111b of the encoding apparatus 100 and the segment extension unit 211 of the decoding apparatus 200 are configured for each extension pixel of the extension region of the first segment of the reference frame to determine the pixel value of the extension pixel on the basis of a pixel value of a pixel of the second segment of the reference frame using a mapping configured to map the pixel of the second segment of the reference frame to the image plane of the first segment of the reference frame in such a way that the geometrical distortion across their common edge is compensated.

Figure 3:
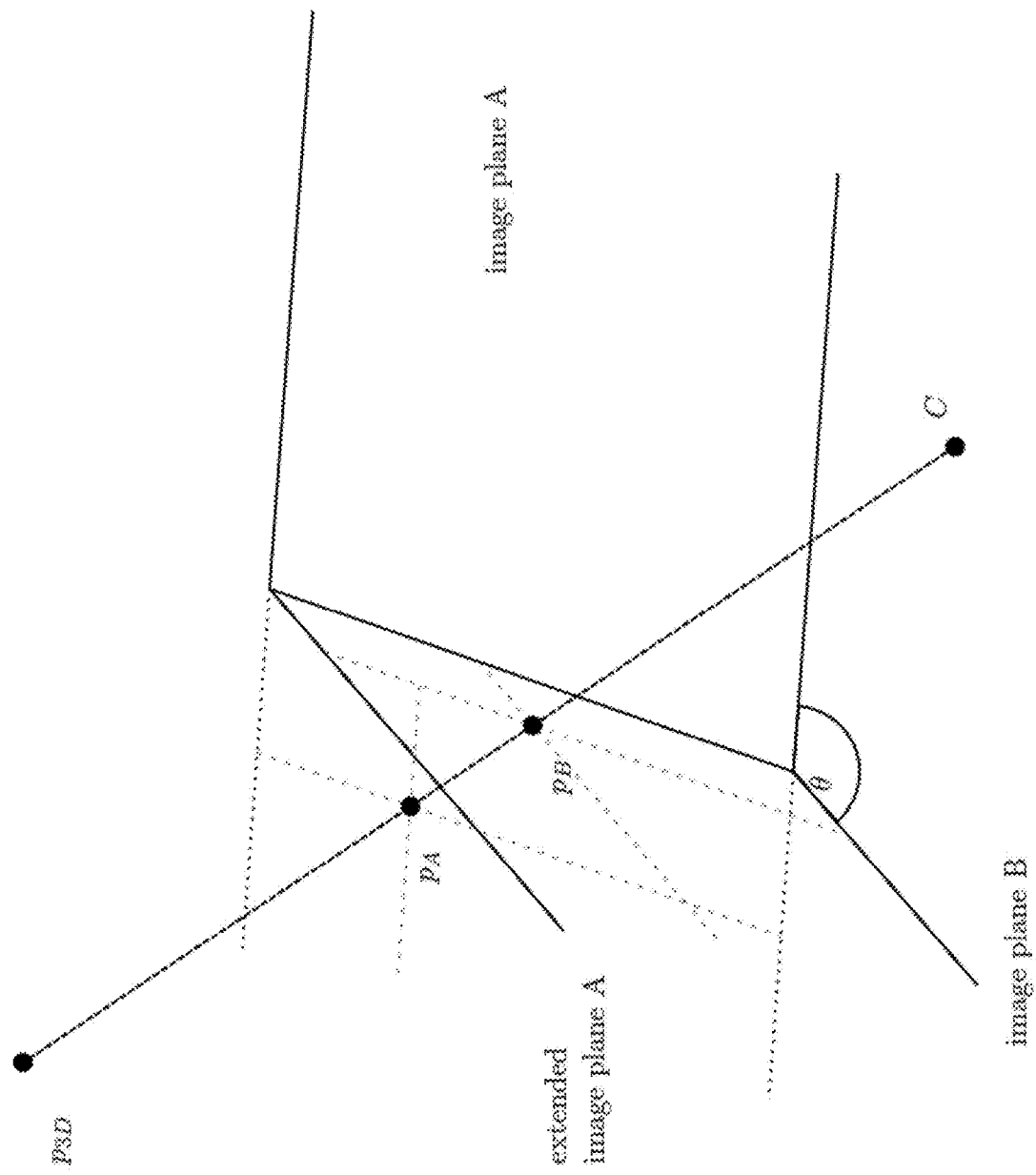
FIG. 3 shows a schematic diagram illustrating a geometrical transformation for generating an extension region implemented in an encoding apparatus and a decoding apparatus according to an embodiment.

FIG. 3 illustrates a mapping or geometric transformation implemented in the segment extension unit 111a, 111b of the encoding apparatus 100 and the segment extension unit 211 of the decoding apparatus 200 that allows for a compensation of the geometrical distortion across the common edge of the first segment and the adjacent second segment of the reference frame. Here it is assumed that the first segment (also referred to as segment A being associated with an image plane A) and the second segment (also referred to as segment B being associated with an image plane B) have the same camera position or camera center C and share a border.

As can be taken from FIG. 3, a point $p_{3D}$ in 3D space lies on a ray through the camera center C, which intersects the image plane A and the image plane B. Consequently, a point $p_B$ in the image plane B can be projected or mapped to a point $p_A$ in the image plane A. For this operation no knowledge of the distance of the 3D point $p_{3D}$ from the camera center C is required.

Mathematically, this can be expressed in the following way. The point $p_{3D}$ can be expressed as a vector in 3D space, i.e. $p_{3D}=(X,Y,Z)^T$. The homogeneous representation $p_{3Dh}$ of the point $p_{3D}$ can be expressed as $p_{3Dh}=(p_{3D}, 1)^T$.

The projection of the homogeneous representation $p_{3Dh}$ onto the image plane B, which is denoted as $p_{imBh}$, can be expressed as follows:

$$p_{imBh} = P_B p_{3Dh} = (K_B \ 0) \begin{pmatrix} p_{3D} \\ 1 \end{pmatrix} = K_B p_{3D} = \begin{pmatrix} x_B \\ y_B \\ 1 \end{pmatrix}$$

wherein $K_B$ is the calibration matrix of the camera associated with the image plane B. The, above equation can be expressed somewhat differently in the following form:

$$p_{imBh} = K_B p_{3D} = \begin{pmatrix} f_x X + p_x Z \\ f_y Y + p_y Z \\ Z \end{pmatrix} = Z^{-1} \begin{pmatrix} x_B \\ y_B \\ 1 \end{pmatrix}$$

Since homogenous coordinates are defined only up to scale, the scaling factor $Z^{-1}$ can be omitted for providing the normalized homogeneous image coordinates $p_{imBh}=(x_B, y_B, 1)^T$. This normalized form can also be obtained directly in the following way:

$$p_{imBh} = Z^{-1} K_B p_{3D} = \begin{pmatrix} x_B \\ y_B \\ 1 \end{pmatrix}$$

If the distance of the point from the camera is known, the projection can be inversed in the following way:

$$p_{3Dh} = \begin{pmatrix} K_B^{-1} & \\ 0 \ 0 & Z^{-1} \end{pmatrix} p_{imBh} = \begin{pmatrix} K_B^{-1} p_{imBh} \\ Z^{-1} \end{pmatrix} = \begin{pmatrix} K_B^{-1} Z^{-1} K_B p_{3D} \\ Z^{-1} \end{pmatrix} = Z^{-1} \begin{pmatrix} p_{3D} \\ 1 \end{pmatrix}$$

Also in this case the scale factor $Z^{-1}$ can be dropped. The point obtained in the way described above can then be projected onto the image plane A. However, since the image plane A has a different orientation than the image plane B, first a rotation R around the camera center C has to be performed for aligning the image plane A with the image plane B. This rotation R is defined by the angle $\theta$ between the image pane A and the image plane B and can be also expressed as a combination of rotations about the respective coordinate axes, i.e.:

$$R(\theta) = R_x R_y R_z$$

The rotation can also be expressed in homogeneous coordinates as follows:

$$R_h = \begin{pmatrix} R(\theta) & 0 \\ 0 & 1 \end{pmatrix}$$

Thus, the point $p_B$ in the image plane B can be projected or mapped to the corresponding point $p_A$ in the image plane A:

$$p_{imA} = (K_A \ 0) \begin{pmatrix} R(\theta) & 0 \\ 0 & 1 \end{pmatrix} \begin{pmatrix} K_B^{-1} & \\ 0 \ 0 & Z^{-1} \end{pmatrix} p_{imBh}$$

Thus, the homography matrix $H_{B2A}$ for transferring a point from the image plane B to the image plane B can be expressed as follows:

$$H_{B2A} = (K_A \ 0) \begin{pmatrix} R(\theta) & 0 \\ 0 & 1 \end{pmatrix} \begin{pmatrix} K_B^{-1} & \\ 0 \ 0 & Z^{-1} \end{pmatrix} = K_A R(\theta) K_B^{-1}$$

As can be seem from the above equation for determining the homography matrix $H_{B2A}$ the distance Z from the camera C drops out of the equation, as this information is not necessary for performing the homography.

For more details about the transformations described above reference is made to the textbook "Multiple View Geometry in Computer Vision", Richard Harley and Andrew Zisserman, second edition, Cambridge University Press, 2003, which is entirely incorporated herein by reference.

Thus, in an embodiment, the mapping or geometrical transformation implemented in the segment extension unit 111a, 111b of the encoding apparatus 100 and the segment extension unit 211 of the decoding apparatus 200 comprises the following steps: projecting the pixel or point $p_B$ of the second segment of the reference frame to the point $p_{3D}$ in three-dimensional space, wherein the point $p_{3D}$ lies on the line connecting the pixel $p_B$ of the second segment of the reference frame with the camera position C; performing a rotation for rotating the image plane B of the second segment of the reference frame into a parallel orientation with the image plane A of the first segment of the reference frame; and projecting the point $p_{3D}$ to the point $p_A$ in the image plane A of the first segment of the reference frame, wherein the point $p_A$ in the image plane A of the first segment of the reference frame defines an extension pixel.

In a further embodiment, the mapping or geometrical transformation implemented in the segment extension unit 111a, 111b of the encoding apparatus 100 and the segment extension unit 211 of the decoding apparatus 200 is based on the following homography matrix $H_{B2A}$:

$$H_{B2A} = (K_A \ 0) \begin{pmatrix} R(\theta) & 0 \\ 0 & 1 \end{pmatrix} \begin{pmatrix} K_B^{-1} & \\ 0 \ 0 & Z^{-1} \end{pmatrix} = K_A R(\theta) K_B^{-1}$$

Figure 4:
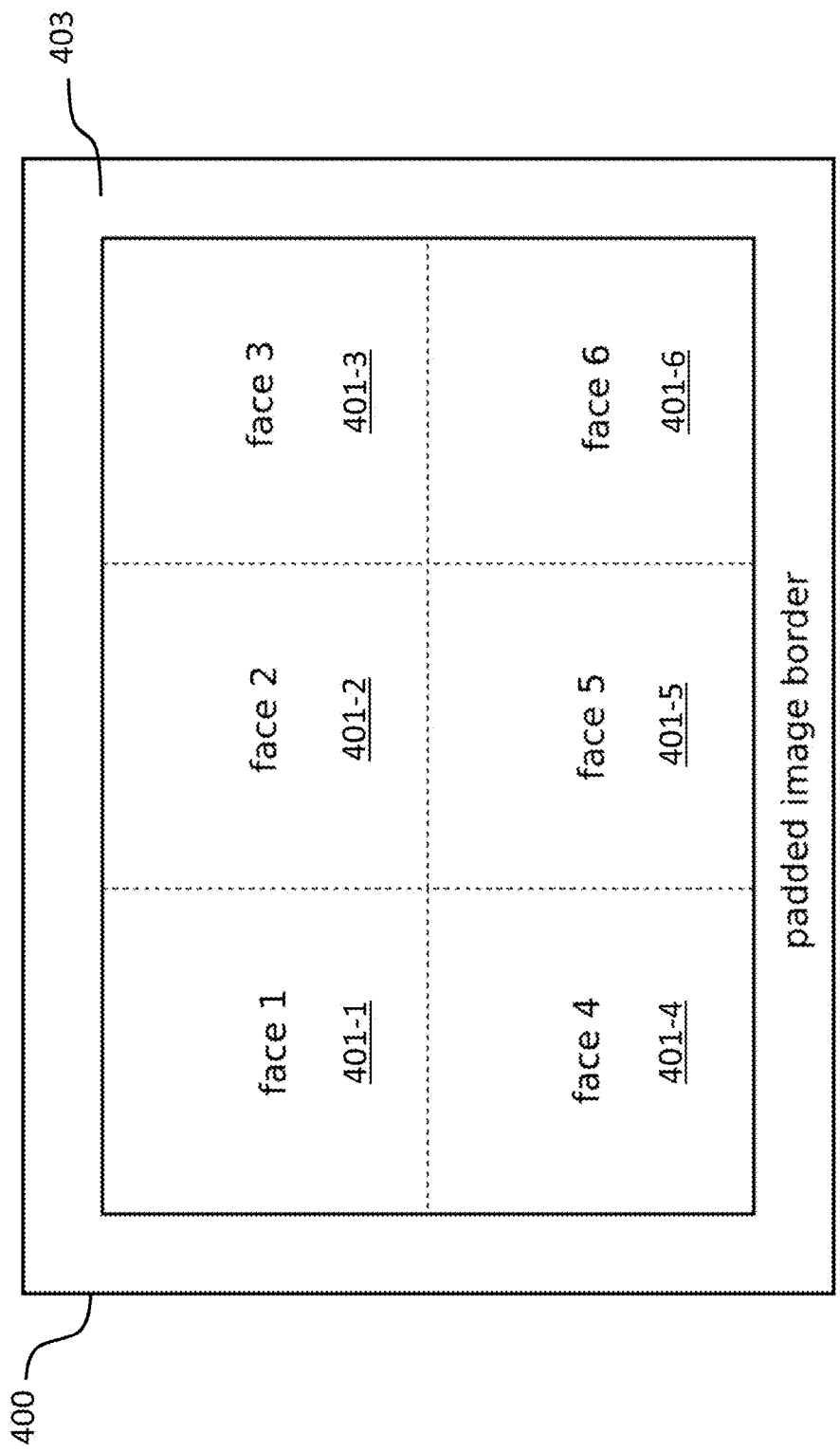
FIG. 4 shows a schematic diagram illustrating a frame of a video signal that can be processed by an encoding apparatus and a decoding apparatus according to an embodiment.
Figure 5:
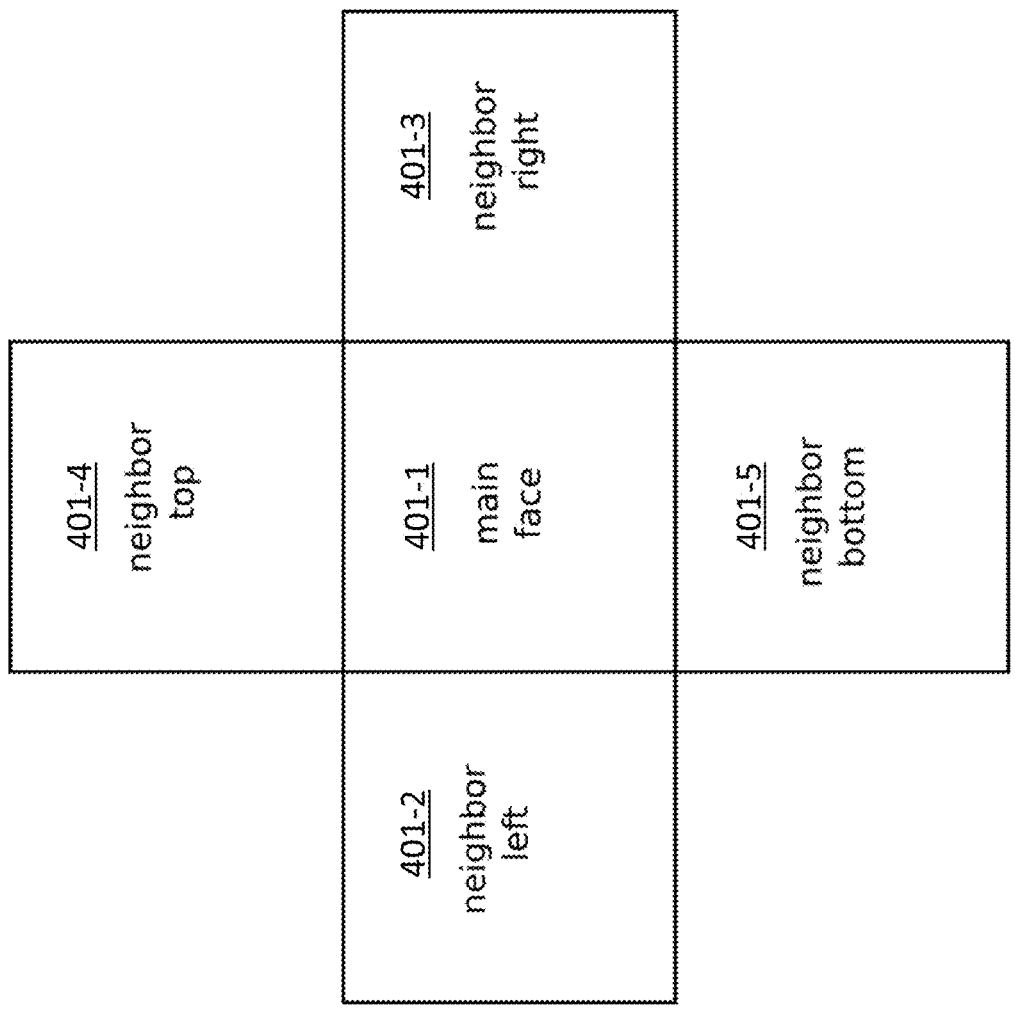
FIG. 5 shows a schematic diagram illustrating geometrical relationship of the segments of a frame of a video signal that can be processed by an encoding apparatus and a decoding apparatus according to an embodiment.

In the following the above approach will be explained in the context of a 360° video signal, wherein the segments are the six faces of a cube, i.e. wherein the 360° video signal has been mapped to the six segments defining a cube. The faces or segments of the cube are arranged in a frame. One possible arrangement of a frame 400 is shown in FIG. 4, including the cube segments 401-1, . . . , 401-6 and an padded image border 403. Every cube segments 401-1, . . . , 401-6 can be defined to be a main face or segment having four adjacent or neighboring segments, as shown in FIG. 5, where the cube segment 401-1 has been selected as the main face. Without the geometrical corrections provided by the claimed disclosure, there would be geometrical distortions across the borders of the segments shown in FIG. 5.

For the sake of simplicity it is assumed that the resolution of the different cube segments is the same. Moreover, it is assumed that the respective principal points with coordinates $(p_x, p_y)^T$ lie in the center of the respective cube segments. In such an embodiment, the calibration matrices $K_A$ and $K_B$ can be expressed in the following way:

$$K_A = K_B = \begin{pmatrix} f & 0 & 0 \\ 0 & f & 0 \\ 0 & 0 & 1 \end{pmatrix}$$

and $$K_B^{-1} = \begin{pmatrix} f^{-1} & 0 & 0 \\ 0 & f^{-1} & 0 \\ 0 & 0 & 1 \end{pmatrix}$$

wherein f denotes a focal length, which can be determined using geometrical considerations, to be equal to w/2, wherein w denotes the width of a cube segment in pixels.

For this embodiment it is assumed that the image plane A of the first segment coincides with the x-y plane of a Cartesian coordinate system, while the image plane B of the second segment lies in the y-z plane thereof. In this embodiment, the rotation for aligning the image plane A with the image plane B is a rotation by 90° about the y axis. In this case, the homography matrix $H_{B2A}$ can be expressed in the following way:

$$H_{B2A} =$$

$$K_A R_y(90°) K_B^{-1} = \begin{pmatrix} f & 0 & 0 \\ 0 & f & 0 \\ 0 & 0 & 1 \end{pmatrix} \begin{pmatrix} \cos(\theta) & 0 & \sin(\theta) \\ 0 & 1 & 0 \\ -\sin(\theta) & 0 & \cos(\theta) \end{pmatrix} \begin{pmatrix} f^{-1} & 0 & 0 \\ 0 & f^{-1} & 0 \\ 0 & 0 & 1 \end{pmatrix} =$$

$$\begin{pmatrix} f & 0 & 0 \\ 0 & f & 0 \\ 0 & 0 & 1 \end{pmatrix} \begin{pmatrix} 0 & 0 & 1 \\ 0 & 1 & 0 \\ -1 & 0 & 0 \end{pmatrix} \begin{pmatrix} f^{-1} & 0 & 0 \\ 0 & f^{-1} & 0 \\ 0 & 0 & 1 \end{pmatrix} =$$

$$\begin{pmatrix} f & 0 & 0 \\ 0 & f & 0 \\ 0 & 0 & 1 \end{pmatrix} \begin{pmatrix} 0 & 0 & 1 \\ 0 & f^{-1} & 0 \\ f^{-1} & 0 & 0 \end{pmatrix} = \begin{pmatrix} 0 & 0 & f \\ 0 & 1 & 0 \\ -f^{-1} & 0 & 0 \end{pmatrix} = f^{-1} \begin{pmatrix} 0 & 0 & f^2 \\ 0 & f & 0 \\ -1 & 0 & 0 \end{pmatrix}$$

$$H_{B2A} = \begin{pmatrix} 0 & 0 & f^2 \\ 0 & f & 0 \\ -1 & 0 & 0 \end{pmatrix}$$

Again, also here the scaling factor $f^{-1}$ can be dropped.

Thus, in an embodiment, the mapping or geometrical transformation implemented in the segment extension unit 111a, 111b of the encoding apparatus 100 and the segment extension unit 211 of the decoding apparatus 200 is based on the following homography matrix $H_{B2A}$:

$$H_{B2A} = \begin{pmatrix} 0 & 0 & f^2 \\ 0 & f & 0 \\ -1 & 0 & 0 \end{pmatrix}$$

Figure 6:
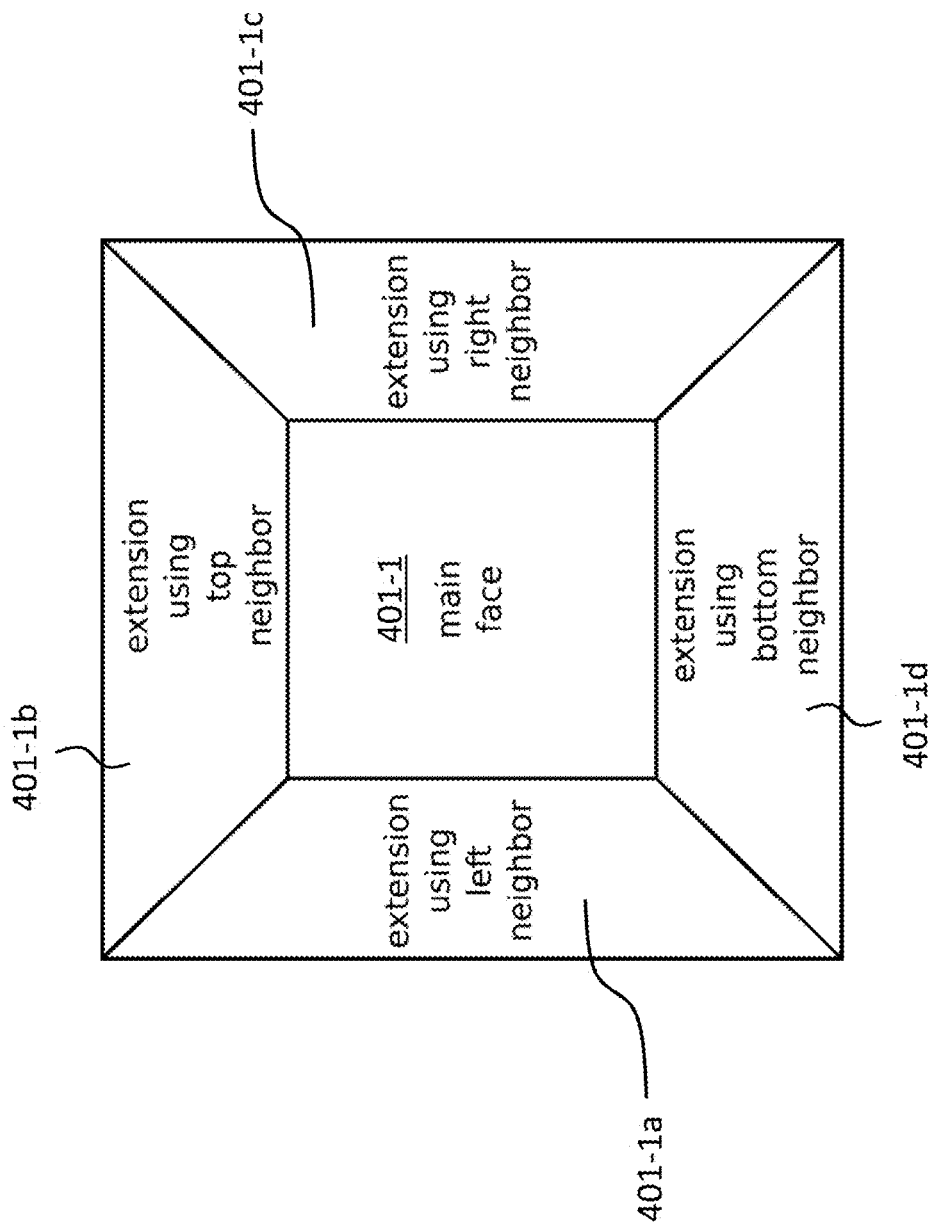
FIG. 6 shows a schematic diagram illustrating a segment of a video signal including its extension regions as generated by an encoding apparatus and a decoding apparatus according to an embodiment.

In an embodiment, each of the six cube segments 401-1, . . . , 401-6 shown in FIG. 4 can be extended on the basis of pixel values of pixels of the respective adjacent segments. In FIG. 6 this is illustrated for the cube segment 401-1, which can have an extension region 401-1a based on its left neighbor segment 401-2, an extension region 401-1b based on its top neighbor segment 401-4, an extension region 401-1c based on its right neighbor segment 401-3, and an extension region 401-1d based on its bottom neighbor segment 401-5.

In an embodiment, the extension regions can be always provided by the segment extension unit 111a, 111b of the encoding apparatus 100 and the segment extension unit 211 of the decoding apparatus 200 for inter frame prediction. One will appreciate, however, that the compensated block does not necessarily differ from the original block. For instance, for a block for which motion compensation shall be performed lies at the edge of a face (the main face in FIG. 5). The area in which the motion compensation is performed is extended on the basis of the location of the block which shall be predicted. The four neighboring segments can be used together with the main segment to generate an extended segment, i.e. the main segment and its extension regions. The area of the main segment is hereby not modified. Only the area around the main segment is modified, it is generated from the other segments. As long as the motion compensation operates inside the main segment 401-1 the behavior is the same as without the segment extension provided by embodiments of the disclosure. When the motion compensation is searching beyond the edge of the main segment the behavior differs, here information from the extension regions is used.

Figure 7:
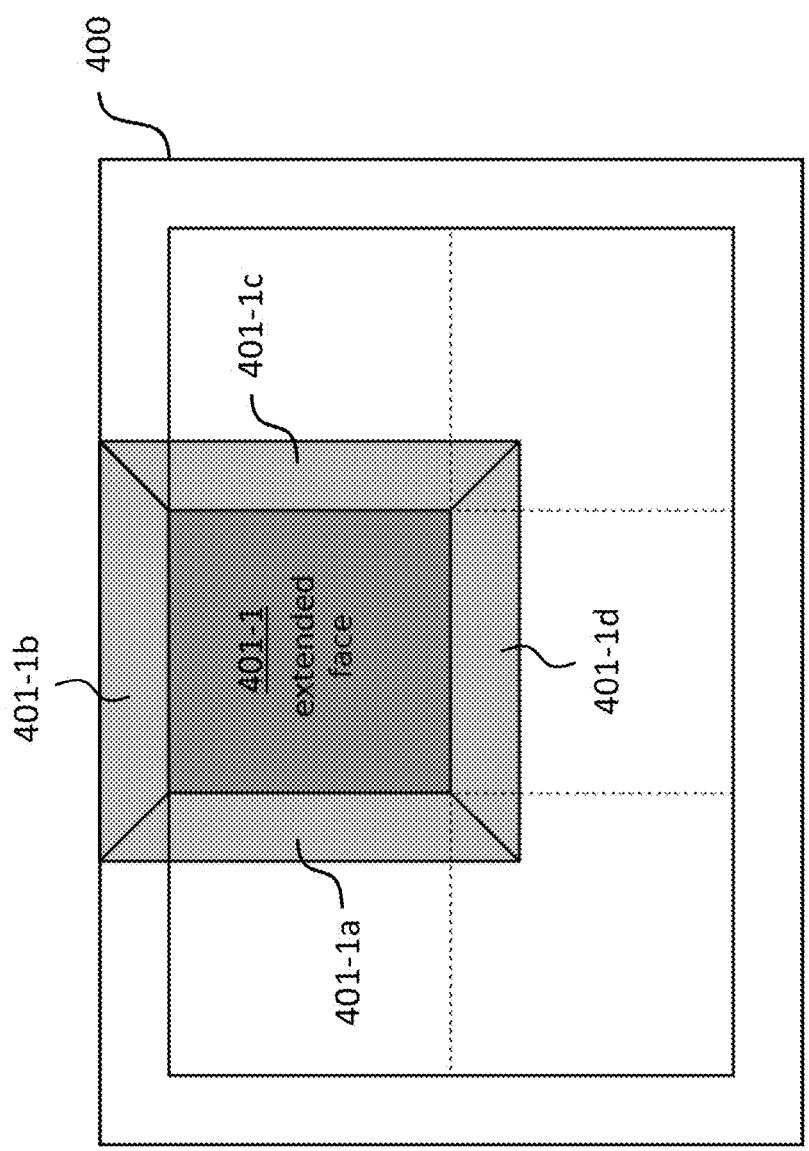
FIG. 7 shows a schematic diagram illustrating a segment of a video signal including its extension regions within a frame as generated by an encoding apparatus and a decoding apparatus according to an embodiment.

Similar homographies apply for the other segments. Each cube segment can be extended in the manner described above. However, this can have the effect that extended regions overlap each other. Thus, in an embodiment, the extended regions can be stored in separate additional reference pictures or frames, as illustrated in FIG. 7. The reference picture which has to be used during encoding and decoding is derived based on the spatial location of the block which is currently processed. Thus, no additional signaling is needed (the number of pictures in the reference picture lists is unchanged). More specifically, although in the example shown in FIG. 7 six reference pictures can be considered to be available now instead of one, only one is used for a given prediction block, as, in an embodiment, the block can be assigned to a single segment and its corresponding extension regions (which, in turn, is determined by the location of the block). In an embodiment, this can be done by transparently replacing the reference picture used by the encoding apparatus 100 with the corresponding additional reference picture based on the location of the block which is processed. The encoding apparatus 100 and the decoding apparatus 200 are not "aware" that there are more reference pictures. The replacement only happens when the actual YUV buffer is accessed. The replacement can be performed for the past and future reference pictures in the reference picture list of the picture which shall be predicted.

Thus, embodiments of the disclosure increase the computational complexity only modestly. The additionally required operations amount to the creation of the extended regions. The memory requirement may increase, as 6 pictures are stored instead of one. This is however an issue of the particular implementation. More efficient embodiments may not need to store all of the additional 6 pictures, but could store only the data required for the small regions around each segment. Another alternative embodiment consists in applying the extension for each block and search location. This would require no additional storage, however it would lead to additional computational complexity, as the compensation would have to be performed for each searched location.

Embodiments of the disclosure also account for the "wrapping around" of a 360° video signal. Each segment border can be extended with information from its neighbors. This is also true for the segment borders coinciding with the borders of the 360° image. As can be seen in FIG. 7, the extended segment 401-1 requires no padding. Instead, the padding area can be filled with content of another cube segment. The size of the extended region can be derived from the search range used by the encoding apparatus 100 during motion compensation such that its size matches the size of the picture border padding.

Figure 8:
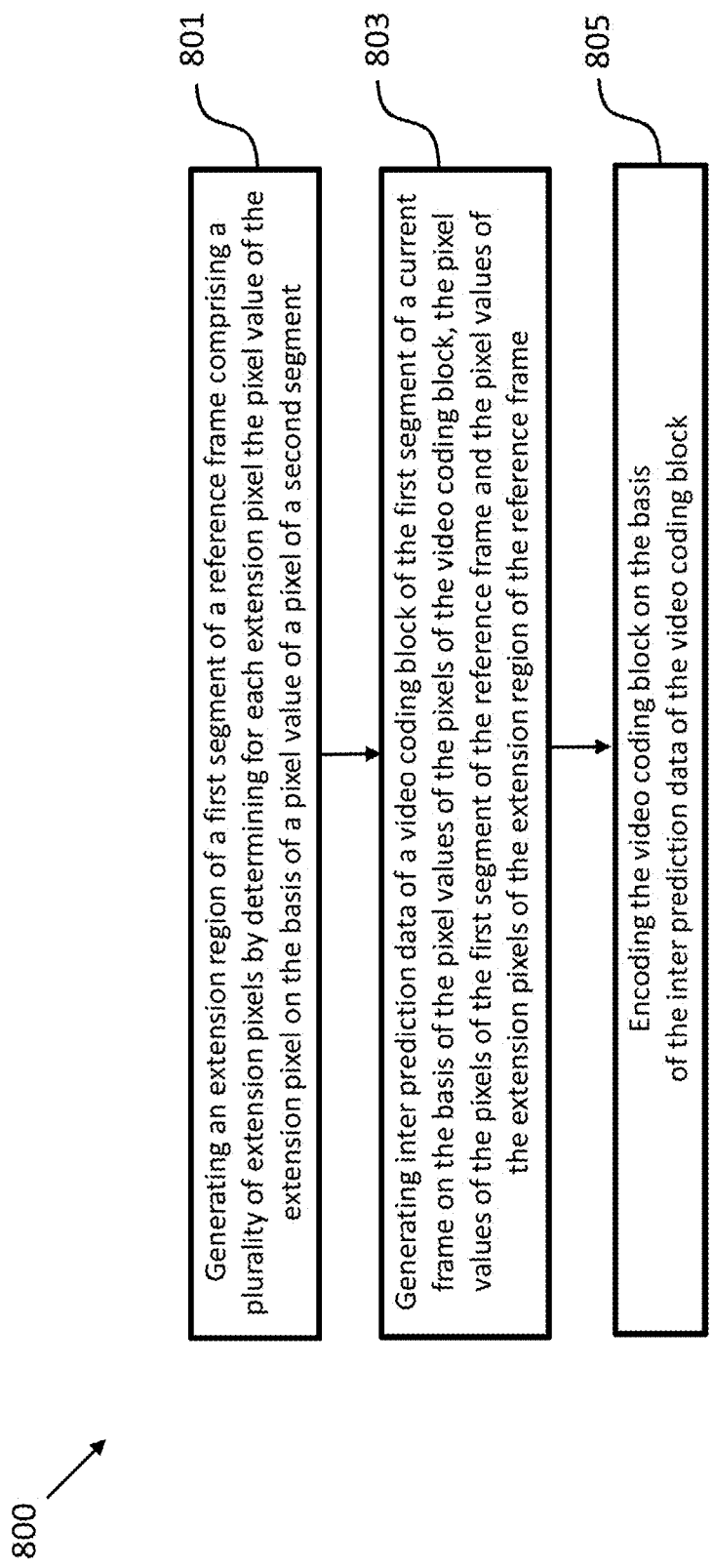
FIG. 8 shows a schematic diagram illustrating a method for encoding a video signal according to an embodiment.

FIG. 8 shows a schematic diagram illustrating a method 800 for encoding a video signal according to an embodiment, wherein the video signal comprises a plurality of frames and each frame comprises a plurality of segments, including a first segment and second segment. Each segment is associated with a different image plane and is dividable into a plurality of video coding blocks, wherein each video coding block comprises a plurality of pixels and each pixel is associated with a pixel value.

The encoding method 800 comprises the following steps: generating 801 an extension region of the first segment in a reference frame comprising a plurality of extension pixels by determining the pixel value of the extension pixel on the basis of a pixel value of a pixel of the second segment in the reference frame; performing 803 motion compensation of a video coding block of the first segment in a current frame on the basis of the pixels of the first segment in the reference frame and the extension pixels of the extension region in the reference frame; and generating 805 an encoded video coding block in the current frame on the basis of the predicted video coding block.

In short, a segment of a reference frame and an extension region generated from another segment of the reference frame are used for encoding a current frame by inter-prediction.

Figure 9:
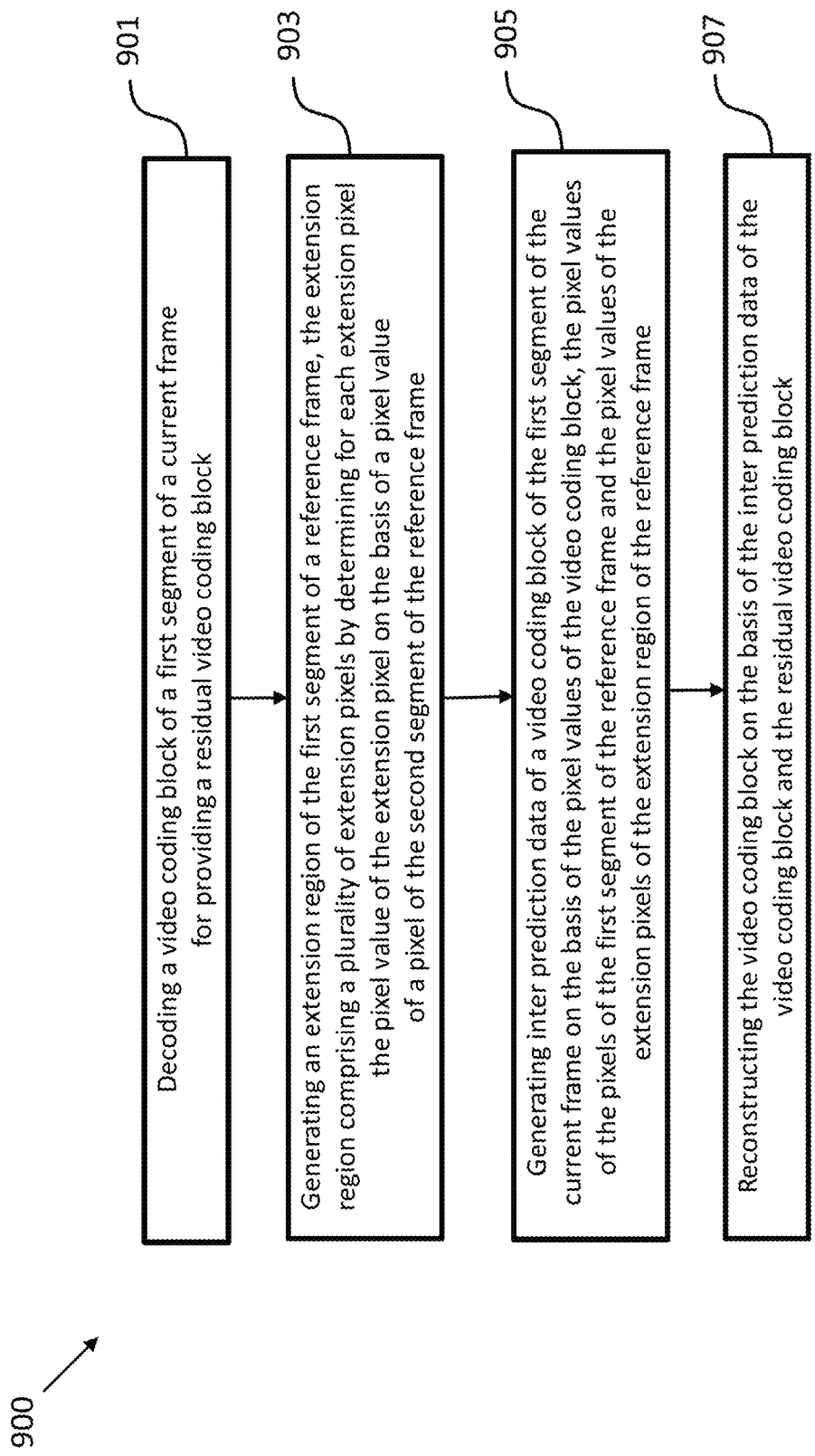
FIG. 9 shows a schematic diagram illustrating a method for decoding a video signal according to an embodiment.

FIG. 9 shows a schematic diagram illustrating a method 900 for decoding a video signal according to an embodiment, wherein the video signal comprises a plurality of frames and each frame comprises a plurality of segments, including a first segment and second segment. Each segment is associated with a different image plane and is dividable into a plurality of video coding blocks, wherein each video coding block comprises a plurality of pixels and each pixel is associated with a pixel value.

The decoding method 900 comprises the following steps: decoding 901 a video coding block of the first segment in a current frame for providing a residual video coding block; generating 903 an extension region of the first segment in a reference frame comprising a plurality of extension pixels by determining the pixel value of the extension pixel on the basis of a pixel value of a pixel of the second segment in the reference frame; performing 905 motion compensation of the video coding block of the first segment in the current frame on the basis of the pixels of the first segment in the reference frame and the extension pixels of the extension region in the reference frame; and reconstructing 907 the video coding block in the current frame on the basis of the predicted video coding block and the residual video coding block.

The proposed technique has been described herein mainly with reference to two segments, but can be readily adapted to a video signal with video content of more than two segments. Specifically, a segment can be extended using image content from several other segments.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. An apparatus, comprising:
    a computer-readable medium comprising program code; and
    computer hardware configured to execute the program code to encode a video signal, wherein the video signal comprises video content of a first image plane and video content of a second image plane, the video content of the first image plane and the video content of the second image plane comprises a plurality of successive frames, wherein each frame of the plurality of successive frames comprises a first segment that comprises image content of the first image plane and a second segment that comprises image content of the second image plane, the first segment and the second segment each comprising a plurality of pixels, each pixel being associated with a pixel value, by performing the steps of:

generating an extension region of the first segment of a reference frame, wherein the extension region comprises a plurality of extension pixels, wherein, for each extension pixel of the plurality of extension pixels, a pixel value is determined for the extension pixel based on a pixel value of a pixel of the second segment of the reference frame;

selecting a reference block among a set of candidate reference blocks, the set of candidate reference blocks comprising a candidate reference block located entirely or partly in the extension region of the first segment of the reference frame; and encoding the pixel values of the pixels of a video coding block of the first segment of a current frame based on the pixel values of the pixels of the video coding block and the pixel values of the pixels of the selected reference block;

wherein for each extension pixel of the plurality of extension pixels, the pixel value of the extension pixel is determined by performing a mapping that maps the pixel of the second segment of the reference frame to the first image plane or that maps the extension pixel to the second image plane, wherein performing the mapping comprises:

projecting a pixel $p_B$ of the second segment of the reference frame to a point $p_{3D}$ in three-dimensional space, wherein the point $p_{3D}$ lies on a line connecting the pixel $p_B$ of the second segment of the reference frame with a camera position C;

performing a rotation for rotating the image plane of the second segment of the reference frame into a parallel orientation with respect to the image plane of the first segment of the reference frame; and projecting the point $p_{3D}$ to a point $p_A$ in the image plane of the first segment of the reference frame, wherein the point $p_A$ in the image plane of the first segment of the reference frame defines an extension pixel; and wherein the mapping is based on the following homography matrix $H_{B2A}$:

$$H_{B2A} = (K_A \quad 0) \begin{pmatrix} R(\theta) & 0 \\ 0 & 1 \end{pmatrix} \begin{pmatrix} K_B^{-1} \\ 0 \quad 0 \quad Z^{-1} \end{pmatrix} = K_A R(\theta) K_B^{-1}$$

wherein $K_A$ and $K_B$ denote camera calibration matrices for the first segment and the second segment of the reference frame, respectively, $\theta$ denotes an angle between the image plane of the first segment and the image plane of the second segment of the reference frame, $R(\theta)$ denotes a rotation, and Z denotes a distance from a camera position C.

2. The apparatus of claim 1, wherein the encoding apparatus further comprises a reference frame buffer configured to store the first segment of the reference frame together with the extension region of the first segment of the reference frame.

3. The apparatus of claim 1, wherein the first segment corresponds to a first face of a cube or of an icosahedron, and the second segment corresponds to different faces of the cube or the icosahedron.

4. The apparatus of claim 1, wherein generating the extension region of the first segment of the reference frame is based on information at a block level for each video coding block, at a frame level, at a GOP (group of pictures) level, at a PPS (picture parameter set) level, or at an SPS (sequence parameter set) level.

5. An apparatus, comprising:
a computer-readable medium comprising program code; and
computer hardware configured to execute the program code to decode an encoded video signal, the encoded video signal comprising video content that includes video content of a first image plane and video content of a second image plane, the video content of the first image plane and the video content of the second image plane being provided in an encoded form of a plurality of successive frames, wherein each frame of the plurality of successive frames comprises a first segment that comprises image content of the first image plane and a second segment that comprises image content of the second image plane, the first segment and the second segment each comprising a plurality of pixels, each pixel being associated with a pixel value, by performing the steps of:

generating an extension region of the first segment of a reference frame, the extension region comprising a plurality of extension pixels, wherein, for each extension pixel of the plurality of extension pixels, a pixel value of the extension pixel is determined based on a pixel value of a pixel of the second segment of the reference frame; and reconstructing the pixel values of the pixels of a video coding block of the first segment of a current frame based on an encoded video coding block of the first segment of the current frame and the pixel values of the pixels of a reference block, wherein the reference block is located entirely or partly in the first segment of the reference frame or entirely or partly in the extension region of the first segment of the reference frame;

wherein for each extension pixel of the plurality of extension pixels, the pixel value of the extension pixel is determined based on performing a mapping that maps the pixel of the second segment of the reference frame to the image plane or that maps the extension pixel to the second image plane, wherein performing the mapping comprises:

projecting a pixel $p_B$ of the second segment of the reference frame to a point $p_{3D}$ in three-dimensional space, wherein the point $p_{3D}$ lies on a line connecting the pixel $p_B$ of the second segment of the reference frame with a camera position C;

performing a rotation for rotating the image plane of the second segment of the reference frame into a parallel orientation with respect to the image plane of the first segment of the reference frame; and projecting the point $p_{3D}$ to a point $p_A$ in the image plane of the first segment of the reference frame, wherein the point $p_A$ in the image plane of the first segment of the reference frame defines an extension pixel; and wherein the mapping is based on the following homography matrix $H_{B2A}$:

$$H_{B2A} = (K_A \; 0)\begin{pmatrix} R(\theta) & 0 \\ 0 & 1 \end{pmatrix}\begin{pmatrix} K_B^{-1} \\ 0 \; 0 \; Z^{-1} \end{pmatrix} = K_A R(\theta) K_B^{-1}$$

wherein $K_A$ and $K_B$ denote camera calibration matrices for the first segment and the second segment of the reference frame, respectively, $\theta$ denotes an angle between the image plane of the first segment and the image plane of the second segment of the reference frame, $R(\theta)$ denotes a rotation, and Z denotes a distance from a camera position C.

6. The apparatus of claim 5, wherein the decoding apparatus further comprises a reference frame buffer configured to store the first segment of the reference frame together with the extension region of the first segment of the reference frame.

7. The apparatus of claim 5, wherein the first segment and the second segment correspond to different faces of a cube or an icosahedron.

8. The apparatus of claim 5, wherein generating the extension region of the first segment of the reference frame is based on information at a block level for each video coding block, at a frame level, at a GOP (group of pictures) level, at a PPS (picture parameter set) level, or at an SPS (sequence parameter set) level.

9. A non-transitory computer-readable medium comprising program code that, when executed, causes a computer to encode a video signal by performing the steps of:
generating an extension region of a first segment of a reference frame of the video signal, wherein the video signal comprises video content that includes video content of a first image plane and video content of a second image plane, the video content of the first image plane and the video content of the second image plane being provided in the form of a plurality of successive frames, wherein each frame of the plurality of successive frames comprises a first segment that comprises image content of the first image plane and a second segment that comprises image content of the second image plane, the first segment and the second segment each comprising a plurality of pixels, each pixel being associated with a pixel value, wherein the extension region comprises a plurality of extension pixels, wherein generating the extension region comprises, for each extension pixel of the plurality of extension pixels, determining a pixel value of the extension pixel based on a pixel value of a pixel of the second segment of the reference frame;
selecting a reference block among a set of candidate reference blocks, the set of candidate reference blocks comprising a candidate reference block located entirely or partly in the extension region of the first segment of the reference frame; and
encoding the pixel values of the pixels of a video coding block of the first segment of a current frame based on the pixel values of the pixels of the video coding block and the pixel values of the pixels of the selected reference block;

wherein for each extension pixel of the plurality of extension pixels, the pixel value of the extension pixel is determined by performing a mapping that maps the pixel of the second segment of the reference frame to the first image plane or that maps the extension pixel to the second image plane, wherein performing the mapping comprises:
projecting a pixel $p_B$ of the second segment of the reference frame to a point $p_{3D}$ in three-dimensional space, wherein the point $p_{3D}$ lies on a line connecting the pixel $p_B$ of the second segment of the reference frame with a camera position C;
performing a rotation for rotating the image plane of the second segment of the reference frame into a parallel orientation with respect to the image plane of the first segment of the reference frame; and
projecting the point $p_{3D}$ to a point $p_A$ in the image plane of the first segment of the reference frame, wherein the point $p_A$ in the image plane of the first segment of the reference frame defines an extension pixel; and wherein the mapping is based on the following homography matrix $H_{B2A}$:

$$H_{B2A} = (K_A \; 0)\begin{pmatrix} R(\theta) & 0 \\ 0 & 1 \end{pmatrix}\begin{pmatrix} K_B^{-1} \\ 0 \; 0 \; Z^{-1} \end{pmatrix} = K_A R(\theta) K_B^{-1}$$

wherein $K_A$ and $K_B$ denote camera calibration matrices for the first segment and the second segment of the reference frame, respectively, $\theta$ denotes an angle between the image plane of the first segment and the image plane of the second segment of the reference frame, $R(\theta)$ denotes a rotation, and Z denotes a distance from a camera position C.

10. The computer-readable medium of claim 9, wherein a reference frame buffer is configured to store the first segment of the reference frame together with the extension region of the first segment of the reference frame.

11. The computer-readable medium of claim 9, wherein the first segment and the second segment correspond to different faces of a cube or an icosahedron.

12. The computer-readable medium of claim 9, wherein generating the extension region of the first segment of the reference frame is based on information at a block level for each video coding block, at a frame level, at a GOP (group of pictures) level, at a PPS (picture parameter set) level, or at an SPS (sequence parameter set) level.

13. A non-transitory computer-readable medium comprising program code for causing a computer to decode an encoded video signal by performing the steps of:
generating an extension region of a first segment of a reference frame of the encoded video signal, wherein the encoded video signal comprises video content that includes video content of a first image plane and video content of a second image plane, the video content of the first image plane and the video content of the second image plane being provided in an encoded form of a plurality of successive frames, wherein each frame of the plurality of successive frames comprises a first segment that comprises image content of the first image plane and a second segment that comprises image content of the second plane, the first segment and the second segment each comprising a plurality of pixels, each pixel being associated with a pixel value, wherein the extension region comprises a plurality of extension pixels, wherein generating the extension region comprises, for each extension pixel of the plurality of extension pixels, determining a pixel value of the extension pixel based on a pixel value of a pixel of the second segment of the reference frame; and reconstructing the pixel values of the pixels of a video coding block of the first segment of a current frame based on an encoded video coding block of the first segment of the current frame and the pixel values of the pixels of a reference block, wherein the reference block is located entirely or partly in the first segment of the reference frame or entirely or partly in the extension region of the first segment of the reference frame;

wherein for each extension pixel of the plurality of extension pixels, the pixel value of the extension pixel is determined based on performing a mapping that maps the pixel of the second segment of the reference frame to the image plane or that maps the extension pixel to the second image plane, wherein performing the mapping comprises:

projecting a pixel $p_B$ of the second segment of the reference frame to a point $p_{3D}$ in three-dimensional space, wherein the point $p_{3D}$ lies on a line connecting the pixel $p_B$ of the second segment of the reference frame with a camera position C;

performing a rotation for rotating the image plane of the second segment of the reference frame into a parallel orientation with respect to the image plane of the first segment of the reference frame; and projecting the point $p_{3D}$ to a point $p_A$ in the image plane of the first segment of the reference frame, wherein the point $p_A$ in the image plane of the first segment of the reference frame defines an extension pixel; and wherein the mapping is based on the following homography matrix $H_{B2A}$:

$$H_{B2A} = (K_A \ 0)\begin{pmatrix} R(\theta) & 0 \\ 0 & 1 \end{pmatrix}\begin{pmatrix} K_B^{-1} \\ 0\ 0\ Z^{-1} \end{pmatrix} = K_A R(\theta) K_B^{-1}$$

wherein $K_A$ and $K_B$ denote camera calibration matrices for the first segment and the second segment of the reference frame, respectively, $\theta$ denotes an angle between the image plane of the first segment and the image plane of the second segment of the reference frame, $R(\theta)$ denotes a rotation, and Z denotes a distance from a camera position C.

14. The computer-readable medium of claim 13, wherein a reference frame buffer is configured to store the first segment of the reference frame together with the extension region of the first segment of the reference frame.

15. The computer-readable medium of claim 13, wherein the first segment and the second segment correspond to different faces of a cube or an icosahedron.

16. The computer-readable medium of claim 13, wherein generating the extension region of the first segment of the reference frame is based on information at a block level for each video coding block, at a frame level, at a GOP (group of pictures) level, at a PPS (picture parameter set) level, or at an SPS (sequence parameter set) level.

* * * * *